United States Patent [19]

Murao et al.

[11] Patent Number: 4,826,907

[45] Date of Patent: May 2, 1989

[54] ACRYLIC OR METHACRYLIC RESIN EMULSION COATING COMPOSITION, AND ITS USE

[75] Inventors: Kazuhiro Murao, Yokohama; Akira Maruta, Ikeda, both of Japan

[73] Assignee: Nippon Carbide Kogyo Kabushiki Kaisha, Tokyo, Japan

[21] Appl. No.: 784,659

[22] Filed: Oct. 4, 1985

[30] Foreign Application Priority Data

Oct. 8, 1984 [JP] Japan ................................ 59-209925

[51] Int. Cl.$^4$ ............................................. C08K 5/04
[52] U.S. Cl. .................................... 524/394; 524/398; 524/399; 524/400; 524/522; 525/221; 525/327.4; 525/327.8; 525/330.2; 525/344; 525/355; 525/370
[58] Field of Search ............... 524/394, 398, 399, 400, 524/522; 525/221, 327.4, 327.8, 330.2, 344, 355, 370

[56] References Cited

U.S. PATENT DOCUMENTS

| | | | |
|---|---|---|---|
| 2,754,280 | 7/1956 | Brown et al. | 525/366 |
| 2,972,592 | 2/1961 | Brown et al. | 524/522 |
| 4,384,069 | 5/1983 | Wendel et al. | 524/522 |
| 4,543,386 | 9/1985 | Padget et al. | 524/522 |
| 4,543,387 | 9/1985 | Padget et al. | 524/522 |

*Primary Examiner*—Joseph L. Schofer
*Assistant Examiner*—J. M. Reddick
*Attorney, Agent, or Firm*—Sherman & Shalloway

[57] ABSTRACT

An acrylic or methacrylic resin emulsion coating composition comprising a blended mixture composed of (1) 100 parts by weight as solid resin content of a copolymer resin emulsion [A], the copolymer resin therein having a glass transition temperature Tg(A), determined by the DSC method, of about −10° to about −55° C., and said copolymer resin emulsion [A] being an aqueous emulsion-copolymerization product being free from a copolymerizable diallyl component and derived from acrylic and/or methacrylic monomers (a) and (b) specified in the claims in the presence of a polyoxyethylene/polyoxypropylene block copolymer, (2) 20 to 300 parts by weight as solid resin content of a copolymer emulsion [B], the copolymer resin therein having a glass transition temperature Tg(B), determined by the DSC method, of less than 0° C., and satisfying the following equation $$Tg(B)-Tg(A)=10\sim55° C.$$

and said copolymer resin emulsion [B] being an aqueous emulsion-copolymerization product being free from a copolymerizable diallyl component and derived from acrylic and/or methacrylic monomers (a)' and (b)' specified in the claims in the presence of a polyoxyethylene/polyoxypropylene block copolymer, and (3) about 0.2 to about 10 parts by weight, based on the total weight as solid resin content of emulsions [A] and [B], of a water-soluble polyvalent metal salt (C) of an inorganic or organic acid, the metal salt (C) having a solubility of at least 5 when it is expressed as the grams of said metal salt dissolved in 100 g of water at 20° C.

8 Claims, No Drawings

ACRYLIC OR METHACRYLIC RESIN EMULSION COATING COMPOSITION, AND ITS USE

This invention relates to an acrylic or methacrylic resin emulsion coating composition which is useful, for example, as a resin component of a mastic paint adapted for giving a rough textured coating, an antinoise paint, an anti-vibration paint or a caulking material, particular as a resin component of an anti-chipping material that can be used as a coating material for protecting outside sheet metal parts of vehicles such as an automobile from pebbles or stones.

The acrylic or methacrylic resin (to be sometimes referred to generically as an acrylic resin) emulsion coating composition of this invention is useful for providing an antichipping material, particularly a solventless-type antichipping material, capable of giving a coated film which is thin but shows outstanding improvements in chipping resistance, adhesion to a sheet metal, corrosion resistance, flat film formability, antinoise property, gasoline resistance, cold bending resistance and impact strength. In addition, as compared with conventional compositions of a similar type, the acrylic resin coating composition of this invention has resistance to cratering (blisters which occur during baking) or flash rusting during coating, and excellent hot water resistance.

More specifically, this invention relates to an acrylic or methacrylic resin emulsion coating composition comprising a blended mixture composed of (1) 100 parts by weight as solid resin content of a copolymer resin emulsion [A], the copolymer resin therein having a glass transition temperature Tg(A), determined by the DSC method, of about $-10°$ to about $-55°$ C., and said copolymer resin emulsion [A] being an aqueous emulsion-copolymerization product being free from a copolymerizable diallyl component and derived from 95 to 99.5% by weight of at least one monomeric ester (a) of acrylic and/or methacrylic acid having no carboxyl group in its molecular and 0.5 to 5% by weight of at least one alpha,beta-unsaturated carboxylic acid (b) in the presence of, as a nonionic surface-active agent, a polyoxyethylene/polyoxypropylene block copolymer, (2) 20 to 300 parts of weight as solid resin content of a copolymer emulsion [B], the copolymer resin therein having a glass transition temperature Tg(B), determined by the DSC method, of less than 0° C., and satisfying the following equation $$Tg(B) - Tg(A) = 10° \sim 55° \text{ C.}$$

and said copolymer resin emulsion [B] being an aqueous emulsion-copolymerization product being free from a copolymerizable diallyl component and derived from 95 to 99.5% by weight of at least one monomeric ester (a)' of acrylic and/or methacrylic acid having no carboxyl group in its molecule and 0.5 to 5% by weight of at least one alpha,beta-unsaturated carboxylic acid (b)' in the presence of, as a nonionic surface-active agent, a polyoxyethylene/polyoxypropylene block copolymer, and (3) about 0.2 to about 10 parts by weight, based on the total weight as solid resin content of emulsions [A] and [B], of a water-soluble polyvalent metal salt (C) of an inorganic or organic acid, the metal salt (C) having a solubility of at least 5 when it is expressed as the grams of said metal salt dissolved in 100 g of water at 20° C.

It has been desired to develop a resin composition for an antichipping material, especially a solventless-type antichipping material, which when applied to the surface of a substrate, for example sheet metals, particularly various plated steel sheets plated with lead-tin alloy, tin, aluminum, chrome, and nickel, can form a thin film having excellent antichipping property, adhesion to sheet metal, corrosion resistance, flat film formability, antinoise property, gasoline resistance, cold bending resistance and impact resistance in spite of its small thickness. Conventional coating compositions for forming protective films called antichipping materials show some extent of antichipping effect when applied in a large thickness to a plated steel sheet or electrodeposited film free from an exposed iron surface, but show unsatisfactory antichipping effect when the thickness of the coated film is small. Furthermore, they have very poor corrosion resistance when used alone. In particular, water-base antichipping coating compositions cannot be expected to produce an anticorrosive effect, and rust occurs within a short period of time at iron-exposed parts such as seams and scratches formed during sheet metal working. It has been strongly desired therefore to eliminate this inconvenience. Moreover, coated films prepared from the conventional antichipping resin compositions have raised and depressed portions, and when pebbles or stones hit the depressed portions, they are susceptible to scratching. Water-base antichipping resin compositions, on the other hand, have unsatisfactory adhesiveness after water immersion, particularly immediately after immersion, and it has been desired to eliminate this disadvantage.

As an attempt at such improvement, Japanese Laid-Open Patent Publication No. 187468/1983 provides a water-dispersible resin composition useful as a resin component of a water-base antichipping material, particularly a corrosion-resistant antichipping material, which can circumvent environmental pollution by the dissipation of solvent. The Japanese patent document discloses a water-dispersible resin for antichipping materials comprising a water-dispersible resin having a glass transition temperature Tg of not more than 0° C. which is obtained by copolymerizing a polymerizable monomeric mixture composed of (i) 1 to 25% by weight of a polymerizable monomer containing no carboxyl group in the molecule, a homopolymer of said monomer having a glass transition temperature of at least 0° C., (ii) 70 to 98% by weight of a polymerizable monomer containing no carboxyl group in the molecule, a homopolymer of said monomer having a glass transition temperature of less than 0° C., and (iii) 0.5 to 5% by weight of an alpha,beta-unsaturated carboxylic acid, under emulsion polymerization conditions.

The invention disclosed in the Japanese patent document fails to use, or even suggest the joint use of, a water-soluble polyvalent metal salt of an inorganic or organic acid having a solubility of at least 5. In addition, this patent document neither describes nor suggests a blend of two resin emulsions having glass transition temperatures which are below 0° C. and different from each other, and does not at all refer to such technical problems as cratering and flash rusting. Moreover, the resin in this document is further desired to be improved in chipping resistance, cold bending resistance and hot water resistance.

In another technical field, particularly in the field of pressure-sensitive adhesives, a pressure-sensitive adhesive composed of an acrylic resin emulsion and a weak acid salt of a polyvalent metal, the acrylic resin emulsion comprising an allyl compound comonomer having at least two allyl groups (to be referred to as the copolymerizable diallyl component in the present invention) as an essential component is proposed in Japanese Patent Publication No. 4541/1974.

This pressure-sensitive adhesive is prepared by emulsion-polymerizing a monomeric mixture composed of
(I) 99.4 to 87 parts by weight of a vinyl monomer containing at least 80% by weight of an alkyl acrylate having 4 to 12 carbon atoms in the alkyl moiety,
(II) 0.5 to 10 parts by weight of an unsaturated carboxylic acid copolymerizable with (I), and
(III) 0.1 to 3 parts by weight of an allyl compound having at least two allyl groups,
and adding to the resulting copolymer 1 to 4 equivalents, per equivalent of the carboxylic acid in the copolymer, of a weak acid salt of a divalent or trivalent metal. It is stated that this pressure-sensitive adhesive is suitable for a so-called "free album" produced by coating the pressure-sensitive adhesive on the entire surfaces of thick papers or in various patterns such as lines and crosscuts, drying the coatings, superimposing transparent plastic films such as a rigid polyvinyl chloride film on the coated papers, and binding them.

This Japanese patent document only discloses the use of the weak acid of a polyvalent metal together with an acrylic resin emulsion containing an allyl compound comonomer as an essential component in the technical field of pressure-sensitive adhesive which is quite different from the present invention. It does not at all refer to coating compositions for antichipping materials or others, and suggests nothing about the use of the weak acid salt of a polyvalent metal in such coating compositions. Naturally, it does not at all refer to the use of a blend of two resin emulsions having different glass transition temperatures.

U.S. Pat. No. 2,754,280 proposes aqueous dispersions which are stable and particularly suited as vehicles for surface-coatings and for the production of dry, non-blocking free films or pellicles. According to the disclosure of the U.S. Patent, the dispersions are preferably prepared by emulsifying a mixture of (x) one or more monomeric esters of acrylic and/or methacrylic acid and (y) monomeric acrylic, methacrylic and itaconic acid or mixtures of these acids in water and polymerizing the mixture while it is in the emulsified form, and it is essential that a non-ionic emulsifying or dispersing agent be used. The Patent cites an agent containing polyoxyethylene/polyoxypropylene block copolymer as an example of such a non-ionic agent. Furthermore, the U.S. Patent cites polyvalent metal salts of weak acids, basic salts of polyvalent metals, the oxides and hydroxides of polyvalent metals as examples of basic metallic compounds used to neutralize the carboxyl groups of the resulting copolymer.

The U.S. Patent neither suggests the joint use of the copolymer resin emulsions (1) and (2) in the composition of this invention and the combination of these with the salt (3). It neither touches upon the aforesaid various technical problems and guidelines for solving these problems.

The present inventors have made investigations on the improvement of an acrylic resin emulsion composition which is especially useful as an antichipping material. These investigations have led to the discovery that an acrylic emulsion coating composition having outstanding improved properties can be prepared as a blended mixture of from 100 parts by weight (as a resin solid component) of [A] a resin emulsion which meets the above-specified glass transition Tg(A) determined by the DSC method and is an aqueous emulsion-polymerization product free from a diallyl compound monomer and derived from the above-specified proportions of monomers (a) and (b) in the presence of the above-specified nonionic surface-active agent, [B] the above-specified amount of a resin emulsion which is a similar aqueous emulsion-polymerization product and in which the copolymer has a glass transition temperature Tg(B) of less than 0° C. and satisfying $Tg(B)-Tg(A)=10°\sim55°$ C., and [C] about 0.2 to about 10 parts by weight of a water-soluble polyvalent metal salt of an inorganic or organic acid having a solubility of at least 5 (as the grams of the salt dissolved in 100 g of water at 20° C.).

The present inventors have found that the above new type of acrylic resin emulsion coating composition, for example in the form of an antichipping material comprising additives such as a filler and a pigment, can form a thin flat coated film which in spite of its small thickness exhibits outstanding improvements in chipping resistance, adhesion to a sheet metal, corrosion resistance, flat film formability, antinoise property, gasoline resistance, cold bending resistance and impact strength, and also in the prevention of cratering or flash rusting during coating, and also in hot water resistance.

It is an object of this invention therefore to provide an acrylic resin emulsion coating composition particularly useful as a water-dispersible resin component of an antichipping material.

The above and other objects and advantages of this invention will become apparent from the following description.

Examples of the monomeric ester (a) of acrylic acid and/or methacrylic acid having no carboxyl group in its molecule used to form the copolymer resin emulsion [A] include $C_1-C_{10}$, preferably $C_1-C_8$, alkyl esters of acrylic or methacrylic acid, glycidyl esters of acrylic or methacrylic acid, and hydroxyalkyl esters, such as hydroxy($C_1-C_4$alkyl) esters, of acrylic or methacrylic acid. Specific examples of the monomer (a) are methyl acrylate, ethyl acrylate, propyl acrylate, butyl acrylate, pentyl acrylate, hexyl acrylate, 2-ethylhexyl acrylate, methyl methacrylate, ethyl methacrylate, propyl methacrylate, butyl methacrylate, pentyl methacrylate, hexyl methacrylate, 2-ethylhexyl methacrylate, glycidyl acrylate, glycidyl methacrylate, hydroxymethyl acrylate, hydroxymethyl methacrylate, hydroxyethyl acrylate and hydroxyethyl methacrylate. Of these, methyl acrylate, ethyl acrylate, butyl acrylate, 2-ethylhexyl acrylate, methyl methacrylate, butyl methacrylate and 2-ethylhexyl methacrylate are preferred. The monomers (a) may be used singly or in combination.

The alpha,beta-unsaturated carboxylic acid as comonomer (b) used in the formation of the resin emulsion [A] is, for example, a $C_3-C_5$ alpha,beta-unsaturated carboxylic acid (including its acid anhydride). Specific examples of the comonomer (b) are maleic acid, fumaric acid, crotonic acid, acrylic acid, methacrylic acid and itaconic acid, and acid anhydrides of these. Acrylic acid, methacrylic acid and itaconic acid are preferred. The monomers (b) may be used singly or in combination.

The resin emulsion [A] may contain a small amount of a component derived from another modifying comonomer. Its amount is about 0 to 50% by weight based on the total weight of the monomer (a) and comonomer (b). Examples of such a modifying comonomer are styrene, methylstyrene, ethylstyrene, acrylonitrile, vinyl acetate, vinyl chloride, acrylamide, N-methylolacrylamide, diacetone acrylamide, divinylbenzene, butyl maleate or fumarate, octyl maleate or fumarate, vinyl propionate, vinyl Versatate and vinylidene chloride.

The monomeric ester (a)' of acrylic and/or methacrylic acid having no carboxyl group in its molecule and the alpha,beta-unsaturated carboxylic acid (b)' used to form the copolymer resin emulsion [B] and the other modifying comonomer used in a small amount may be the same as those exemplified above with regard to the formation of the resin emulsion [A]. They may be of the same or different types as or from the components used to form the resin emulsion [A].

The copolymer resin emulsion [A] in the coating composition of this invention is an aqueous emulsion-copolymerization product containing no copolymerizable diallyl component which is derived from 95 to 99.5% by weight of the monomer (a), 0.5 to 5% by weight of the alpha,beta-unsaturated carboxylic acid (b) and 0 to 50% by weight, based on the total weight of the monomer (a) and the comonomer (b), of the other modifying comonomer in the presence of, as a nonionic surface-active agent, a polyoxyethylene/polyoxypropylene block copolymer. The copolymer resin in the resin emulsion [A] has a glass transistion temperature Tg(A), determined by the DSC method, of about $-10°$ C. to about $-55°$ C.

The copolymer resin emulsion [B] in the coating composition of this invention is an aqueous emulsion-copolymerization product free from a copolymerizable diallyl component which is derived from 95 to 99.5% by weight of the monomer (a)', 0.5 to 5% by weight of the alpha,beta-unsaturated carboxylic acid (b)' and 0 to 50% by weight, based on the total weight of the monomer (a)' and the comonomer (b)', of the other modifying comonomer in the presence of, as a nonionic surface-active agent, a polyoxyethylene/polyoxypropylene block copolymer, and the copolymer resin in the emulsion [B] has a glass transition temperature Tg(B), determined by the DSC method, of less than $0°$ C. and satisfying the equation $Tg(B)-Tg(A)=10°\sim55°$ C.

In each of the resin emulsions [A] and [B], the monomers (a) and (b), the monomers (a)' and (b)' and the other modifying monomers may be used singly or in combinations respectively. When a combination of the monomers is used, the total amount of these satisfies the above-specified amounts.

That each of the resin emulsions [A] and [B] should meet the combined requirements of the proportions of the individual monomers and the DSC glass transition temperatures is essential together with a combined parameter requiring the use of the specific nonionic surface-active agent and the inclusion of the specified amount of the water-soluble polyvalent metal salt [C] of an inorganic or organic acid, which has a solubility of less than 5 as the grams of the salt dissolved in 100 g of water at $20°$ C.

If in each of the resin emulsions, either the proportions of the individual monomers or the DSC method glass transition temperatures are outside the ranges specified above under the aforesaid combined parameter, there will be a deleterious effect on the improved properties, the marked improvements on the technical problems overlooked by the prior art, such as the prevention of cratering or flash rusting during coating, and the improved hot water resistance.

The effect of the combination of the aforesaid requirements on the combination of these improved properties cannot be univocally explained since it has to do also with the effects of these improved properties on each other. If the proportion of the monomer (b) or (b)' is larger than the specified proportion, an adverse effect is produced on the improvement of the flash rusting and hot water resistance of the acrylic resin emulsion coating composition. If it is smaller than the specified lower limit, the property of preventing cratering, and the storage stability of the acrylic resin emulsion coating composition are reduced. Furthermore, if the DSC method glass transition temperature of the copolymer resin in the resin emulsion [A] or [B] is higher than the specified upper limit of Tg(A) or Tg(B), the hot water-resistance is reduced and the cold bending resistance and chipping resistance are adversely affected. If it is lower than the specified lower limit, the property of preventing cratering and the hot water resistance are reduced, and the chipping resistance is adversely affected.

The above combination of requirements is essential under such conditions that the coating composition should meet the combined parameter requiring the use of the specific nonionic surface-active agent and the inclusion of the specified amount of the water-soluble polyvalent metal salt [C]. The effect of this combination of requirements can neither be univocally explained. But the use of the surface-active agent serves favorably for the prevention of cratering and the improvement of hot water resistance and further for the improvement of corrosion resistance. The inclusion of the water-soluble polyvalent metal salt [C] acts effectively on the improvement of flash rusting prevention, cratering prevention and hot water resistance and aids in further improvement of chipping resistance. If the amount of the component [C] is larger than the specified upper limit, the storage stability of the resulting coating composition is reduced. If it is smaller than the specified limit, the various improvements described above cannot be achieved.

The aqueous emulsion-copolymerization products in the resin emulsions [A] and [B] used in the coating composition of this invention are free from a copolymerizable diallyl component. Products containing a copolymerizable diallyl component lead to reduced cratering prevention and hot water resistance and adverse effects on cold bending resistance. Furthermore, the presence of a diallyl component adversely affects the reactivity of the monomers during the emulsion copolymerization and makes it difficult to form the desired resin emulsions.

In the present invention, the glass transition temperatures Tg(A) and Tg(B) of the copolymer resins in the emulsions [A] and [B] are measured by the following method.

About 10 mg of a sample of the copolymer resin emulsion is weighed into a cell, and dried at $100°$ C. for 2 hours. Using the dried sample, the glass transition temperature is measured by a differential scanning calorimeter (Model DT-30, supplied by Shimadzu Seisakusho Co., Ltd.) by heating it from −80° C. at a rate of 20° C./min. As a carrier gas, nitrogen gas is used at a flow rate of 20 cc/min.

The resin emulsions [A] and [B] can be produced by copolymerizing the aforesaid proportions of the polymerizable monomers in aqueous emulsion in the presence of, as a nonionic surface-active agent, a polyoxyethylene/polyoxypropylene block copolymer.

Techniques of aqeuous emulsion copolymerization are well known. The polyoxyethylene/polyoxypropylene block copolymer as a nonionic surface-active agent is also known. Such known techniques and surface-active agent can be utilized in the present invention. The aqueous emulsion copolymerization can be carried out in a customary manner in an aqueous medium in the presence of a catalyst and the polyoxyethylene/polyoxypropylene block copolymer and optionally another nonionic surface-active agent and/or a protective colloid at a properly selected reaction temperature, for example about 40° to about 90° C.

The polyoxyethylene/polyoxypropylene block copolymer may, for example, be a compound of the following formula

$$HO-(C_2H_4O)_a-(C_3H_6O)_b-(C_2H_4O)_c-H$$

wherein a represents a number of about 1 to 250, b represents a number of about 10 to 80 and c is a number of about 1 to 250, and a+b+c is, for example, at least about 15, usually about 20 to about 350. Such a known nonionic surfactant can be produced by a known method, for example by the addition reaction of polypropylene glycol with ethylene oxide, or is available commercially.

Examples of commercially available polyoxyethylene/polyoxypropylene block copolymer nonionic surfactants include Newcol 565FH (Japan Emulsion Co., Ltd.), Pronon 102, 104, 105, 201, 204 and 208 (Nippon Oils and Fats Co., Ltd.), Pluronic L-31, L-44, L-61, L-62, L-64, L-101, F-68, F-88, P-84, P-85 and P-103 (Asahi Denka Co., Ltd.; BASF), and Emulgen PP-150, 230, 250 and 290 (Kao Soaps Co., Ltd.), and Pepol B-181, 182, 184 and 188 (Toho Chemical Co., Ltd.).

These surfactants may be used singly or in combination. The amount of the nonionic surfactant can be properly selected, and is, for example, about 0.5 to about 10%, preferably about 1 to about 7%, especially preferably about 2 to about 5%, based on the total weight of the monomers used. Its amount can be changed depending upon the joint use with other surfactants to be mentioned below, and is not restricted to the aforesaid range.

In addition to the polyoxyethylene/polyoxypropylene block copolymer nonionic surface-active agent, other nonionic surfactants, cationic surfactants and amphoteric surfactants may be used jointly. They also serve to control the average particle diameter of the emulsion copolymer in the resulting resin emulsion.

Examples of the other nonionic surfactants are polyoxyalkylene alkyl ethers such as polyoxyethylene lauryl ether and polyoxyethylene stearyl ether; polyoxyalkylene alkyl phenol ethers such as polyoxyethylene octyl phenol ether and polyoxyethylene nonyl phenol ether; sorbitan fatty acid esters such as sorbitan monolaurate, sorbitan monostearate and sorbitan trioleate; polyoxyalkylene fatty acid esters such as polyoxyethylene monolaurate and polyoxyethylene monostearate; and glycerin fatty acid esters such as oleic acid monoglyceride and stearic acid monoglyceride. They may be used either singly or in combination. The amount of these other nonionic surfactants may be properly chosen, and is, for example, 0 to 10%, preferably about 0.05 to 7%, especially preferably 0.1 to 5%.

Examples of the protective colloid that can be used include partially saponified polyvinyl alcohol, completely saponified polyvinyl alcohol, modified polyvinyl alcohol, cellulose derivatives such as hydroxyethyl cellulose, hydroxypropyl cellulose and carboxylmethyl cellulose, salts of these, and natural polysaccharides such as guar gum. They may be used singly or in combination. The amount of the protective colloid that can be used may be properly chosen, and is, for example, 0 to 10%, preferably 0.05 to 5%, especially preferably 0.05 to 2%, based on the total weight of the monomers used.

In view of the stability of the polymerization system, the nonionic surfactant polyoxyethylene/polyoxypropylene block copolymer which is essential is preferably used in combination with the other nonionic surfactant and protective colloid exemplified above. If desired, a small amount of a cationic surface-active agent or an amphoteric surface-active agent may be used in combination with the above-exemplified nonionic surfactants. Examples of such a cationic surfactant include alkylamine salts such as laurylamine acetate, quaternary ammonium salts such as lauryl trimethyl ammonium chloride and alkyl benzyl dimethyl ammonium chlorides, and polyoxyethylenealkylamines. Examples of the amphoteric surfactant are alkylbetaines such as laurylbetaine.

The amount of the cationic surfactant or the amphoteric surfactant may also be properly chosen, and is, for example, 0 to 10%, preferably 0.05 to 5%, especially preferably 0.05 to 2%, based on the total weight of the monomers used.

Illustrative of the catalyst that is used in the aqueous emulsion copolymerization are persulfates such as sodium persulfate, potassium persulfate and ammonium persulfate, organic peroxides such as tertiary butyl hydroperoxide, cumene hydroperoxide and paramenthane hydroperoxide, and hydrogen peroxide. They may be used either singly or in combination. The amount of the catalyst may be properly chosen, and is, for example, about 0.05 to about 1%, preferably about 0.1 to about 0.7%, especially about 0.1 to about 0.5%, based on the total weight of the monomers used.

If desired, a reducing agent may be used in carrying out the aqueous emulsion copolymerization. Examples include reducing organic compounds such as ascorbic acid, tartaric acid, citric acid and glucose, sodium thiosulfate, sodium sulfite, sodium bisulfite and sodium metabisulfite. The amount of the reducing agent may be properly chosen, and is, for example, about 0.05 to about 1% based on the total weight of the monomers used.

In the practice of the aqueous emulsion copolymerization, all the amount of the selected surface-active agent may be added in advance to the reaction system. It is also possible to add a part of the surfactant to the reaction system, start the reaction, and continuously add the remainder, or add the remainder portionwise at intervals, during the reaction. The latter procedure is preferred. The monomers (a) and (b) and the other modifying comonomer, or the monomers (a)' and (b)' and the other modifying monomer may also be added at a time, portionwise or continuously. But from the viewpoint of controlling the reaction, these monomers may be continuously added during the reaction.

In addition to the surface-active agents and catalyst, a pH adjusting agent, an agent for controlling the degree of polymerization, an antifoamer, etc. may be properly added during the emulsion polymerization.

In the resin emulsions [A] and [B], the resulting emulsion copolymers should have the DSC method glass transition temperatures Tg(A) and Tg(B) specified above. Since the glass transition temperatures of the emulsion copolymers may vary depending upon the types of the reaction conditions and the surface-active agent as well as the types and amounts of the individual monomers it is recommendable to carry out the aqueous emulsion copolymerization after experimentally selecting and prescribing these various conditions. The resin emulsions [A] and [B] which can be produced as above have a solids content of, for example, about 30 to about 70% by weight, preferably about 40 to about 65%. The viscosities of the resin emulsions are, for example, not more than about 10,000 cps, specifically about 5 to about 10,000. Preferably, after the emulsion polymerization, the pH of the resulting resin emulsion is adjusted to 3 to 11 with a pH adjusting agent such as ammonia or triethanolamine.

The emulsion copolymers in the resin emulsions [A] and [B] have an average particle diameter of, for example, about 0.25 to 0.60 microns, preferably 0.25 to 0.55 microns, especially preferably 0.3 to 0.55 microns.

If the average particle diameter is too small beyond the exemplified range, cratering tends to occur. If it is too large beyond the exemplified range, corrosion resistance and hot water resitance tend to be reduced. Accordingly, the selection of the average particle diameter within the above-exemplified range is preferred. The average particle diameter can be controlled by properly selecting the types and amounts of the polyoxyethylene/polyoxypropylene block copolymer non-ionic surfactant, the other surfactants used, the catalyst, the reaction conditions and the reaction operations. It can be easily selected and prescribed by preliminary experiments. The above-exemplified factors which are involved in controlling the average particle diameter of the emulsion copolymer affect each other, and cannot be univocally explained. But generally, the average particle diameter can be easily selected and prescribed experimentally by properly selecting the type of the nonionic surfactant, its amount based on the total weight of the monomers used, the type and amount of the catalyst used, and the types and amounts of other surfactants within the ranges exemplified hereinabove.

The average particle diameter of the copolymer resin in the resin emulsion [A] or [B] can be determined as follows: The emulsion is fixed by a negative staining method, observed under an electron microscope and photographed. From the resulting electron micrograph, 300 emulsion particles are sampled at random, and their particle diameters are measured. An arithmetic mean of the measured particle diameters is calculated and defined as the average particle diameter.

The acrylic resin emulsion of this invention includes the resin emulsion [A] and the resin emulsion [B]. It is composed of a blend of 100 parts (as solids) of the resin emulsion [A], 20 to 300 parts of the resin emulsion [B] and about 0.2 to about 10 parts by weight, based on the total weight (as resin solids) of the resin emulsions [A] and [B], of the water-soluble polyvalent metal salt [C].

Water-soluble polyvalent metal salts of inorganic or organic acids having s solubility, expressed as the grams of the salt dissolved in 100 g of water at 20° C., of at least 5 can be widely used as the water-soluble polyvalent metal salt [C]. Preferably, such water-soluble polyvalent metal salts [C] are selected from lower aliphatic carboxylic acid salts, hydrochlorides, chlorides, sulfates, nitrates, nitrites of divalent or trivalent metals. Specific examples include $Zn(CH_3CO_2)_2$, $Al(CH_3CO_2)_3$, $Ca(CH_3CO_2)_2$, $Pb(CH_3CO_2)_2$, $Ni(CH_3CO_2)_2$, $Ba(CH_3CO_2)_2$, $Mn(CH_3CO_2)_2$, $Mg(CH_3CO_2)_2$, $Zn(HCO_2)_2$, $Ca(HCO_2)_2$, $Pb(HCO_2)_2$, $Mg(HCO_2)_2$, $Al(NO_3)_3$, $Al_2(SO_4)_3$, $BaCl_2$, $Ba(NO_2)_2$, $CaCl_2$, $Ca(NO_2)_2$, $Ca(NO_3)_2$, $CuCl_2$, $Cu(NO_3)_2$, $CuSO_4$, $Mg(NO_2)_2$, $MgSO_4$, $MgCl_2$, $Mg(NO_3)_2$, $MnCl_2$, $Mn(NO_3)_2$, $MnSO_4$, $NiCl_2$, $Ni(NO_3)_2$, $NiSO_4$, $ZnSO_4$, $Zn(SO_4)_2$ and $ZnCl_2$. They may be used either singly or in combination.

In the acrylic resin emulsion coating composition of this invention, the proportion of the resin emulsion [B] is 20 to 300 parts by weight, preferably 30 to 250 parts by weight, more preferably 30 to 200 parts by weight, as resin solids, per 100 parts by weight (as resin solids) of the resin emulsion [A]. The joint use of the two resin emulsions shows an excellent improvement in chipping resistance and cold bending resistance over the case of using only the resin emulsion [A].

In additiion to the resin emulsions [A] and [B] and the water-soluble polyvalent metal salt [C] as essential components, the acrylic resin emulsion coating composition of this invention may, as required, further include suitable additives such as other water-dispersible resins, fillers, coloring agents, antiseptics, dispersing agents, thickening agents, thixotropic agents, antifreezing agents and pH adjusting agents.

Examples of the other water-dispersible resins include styrene/butadiene rubber latex, butyl rubber latex, vinyl acetate emulsion, vinyl acetate/acrylate or methacrylate copolymer emulsions, ethylene/vinyl acetate emulsion, an aqueous dispersion of polyurethane and a nitrile/butadiene rubber latex. The amount of the other water-dispersible resin may be properly selected. Preferably, it is a minor amount, for example, not more than about 30% by weight as solids based on the total weight (as solids) of the resin emulsions [A] and [B].

Examples of the fillers include talc, calcium carbonate, diatomaceous earth, mica, kaolin, barium sulfate, magnesium carbonate, Aerosil, vermiculite, graphite, alumina, silica and rubber powder. Such coloring agents as titanium dioxide and carbon black can also be used as the fillers. The amount of the filler may be properly selected, and is, for example, up to about 250 parts by weight, specifically about 70 to about 250 parts by weight, per 100 parts by weight of the resin emulsions [A] and [B] combined.

Various organic pigments and inorganic pigments may be broadly used as the coloring agents, but nontoxic anticorrosive pigments are preferred. Examples of such pigments are phosphate-type anticorrosive pigments such as zinc phosphate, calcium phosphate, aluminum phosphate, titanium phosphate, silicon phosphate and ortho- and fused phosphates of these; molybdate-type anticorrosive pigments such as zinc molybdate, calcium molybdate, calcium zinc molybdate, potassium zinc molybdate, potassium zinc phosphomolybdate and potassium calcium phosphomolybdate; and borate-type anticorrosive pigments such as calcium borate, zinc borate, barium borate, barium meta-borate and calcium meta-borate. The amount of the coloring agent used may also be properly selected, and is, for example, up to about 100 parts by weight, specifically about 10 to about 100 parts by weight, preferably about 30 to about 70 parts by weight, per 100 parts by weight of the resin emulsions [A] and [B] combined.

Examples of the antiseptics are pyrrole compounds, imidazole compounds, thiazole compounds, pyridine compounds and organic halogen compounds. The amount of the antiseptic can be suitably selected, and is, for example, up to about 4 parts by weight, specifically about 0.01 to about 4 parts by weight, based on the total weight of (as solids content) of the resin emulsions [A] and [B].

The dispersing agents may, for example, be inorgaic dispersing agents such as sodium salts of polycarboxylic acids, sodium or ammonium salt of fused naphthalenesulfonate, polyoxyalkylene alkyl ethers or phenol ether, sorbitan fatty acid esters, polyoxyalkylene fatty acid esters, glycerin fatty acid esters, polyoxyethylene styrene phenol, sodium tripolyphosphate and sodium hexametaphosphate. The amount of the dispersant can be properly selected, and is, for example, up to about 10 parts by weight, specifically about 0.05 to about 10 parts by weight, based on the total weight (as solids) of the resin emulsions [A] and [B].

Examples of the thickening agents include polyvinyl alcohol, cellulose derivatives such as hydroxyethyl cellulose, hydroxypropyl cellulose and carboxymethyl cellulose salt, polyether compounds, urethane-modified polyether compounds, polycarboxylic acid compounds, sodium salts of polycarboxylic acid compounds, polyvinylpyrrolidone, polyoxyethylene derivatives such as polyethylene glycol ether and polyethylene glycol distearate, sodium alginate and inorganic materials such as sodium silicate and bentonite. The amount of the thickening agent can be properly chosen, and is, for example, up to about 20 parts by weight, specifically aboout 0.01 to about 20 parts by weight, based on the total amount (as solids) of the resin emulsions [A] and [B].

Examples of the thixotropic agents include polyvinyl alcohol, cellulose derivatives such as hydroxyethyl cellulose, hydroxypropyl cellulose and carboxymethyl cellulose salt, polyether compounds, urethane-modified polyether compounds, polycarboxylic acid compounds, sodium salts of polycarboxylic acid compounds, polyvinyl pyrrolidone, polyoxyethylene derivatives such as polyethylene glycol ether and polyethylene glycol distearate, sodium alginate and inorganic materials such as sodium silicate and bentonite. The amount of the thixotropic agent can be properly chosen, and is, for example, up to about 20 parts by weight, specifically about 0.01 to about 20 parts by weight, based on the total amount (as solids) of the resin emulsions [A] and [B].

Examples of the antifreezing agents are ethylene glycol, propylene glycol, hexylene glycol glycerol, polyethylene glycol, polypropylene glycol and polyoxyethylene sorbitan monolaurate. The amount of the antifreezing agent used can be properly chosen, and is, for example, up to about 30 parts by weight, specifically about 0.5 to about 30 parts by weight, based on the total weight (as solids) of the resin emulsions [A] and [B].

Examples of the pH adjusting agents are sodium hydroxide, potassium hydroxide, sodium hydrogen carbonate, ammonia, triethanolamine, and beta-dimethylaminoethanol. The amount of the pH adjusting agent may be a suitable one which is sufficient to adjust the pH of the acrylic resin emulsion coating composition to a desired value.

The composition of this invention is also useful as a resin component of a mastic paint, an anti-noise paint, an anti-vibration paint or a caulking material. In particular, it is useful as a resin component of an antichipping material for vehicles. Preferably, such an anti-chipping composition has a specific gravity of about 1.1 to about 1.5, a pH of about 7 to about 9, a solids content of at least about 60% and a viscosity, measured by a BH-type viscometer (the rotation speed of the rotor: 20 rpm) of about 100 to about 300 poises.

Now, a method will be described for protecting an article fabricated from a sheet metal using an antichipping material composed of the acrylic resin emulsion coating of this invention. The article fabricated from a sheet metal may, for example, be an article fabricated in various shapes by a press from a steel sheet, a plated steel sheet or a coated steel sheet, for example a gasoline tank or an automotive part obtained by welding such a metal sheet, or may be a coated surface obtained by coating after welding. A gasoline tank fabricated from a plated steel sheet is an example of the article which can be most effectively protected. The method can be applied to an electrodeposition-coated surface, an intermediate-coated surface and a top-coated surface of an article fabricated from a sheet metal outside the room of an automobile, such as the back of the floor, a tire house, a front apron and a rear apron.

The coating on such a surface may be done by a conventional method, and airless coating is generally practiced.

The dry film thickness of the antichipping material preferably used to protect the article made from a sheet metal is about 200 to about 1200 microns. If the dry film thickness is less than about 200 microns, the antichipping property is reduced abruptly. If it is more than 1200 microns, blister (cratering) might undesirably occur during baking and drying.

The antichipping material composed of the composition of this invention can exhibit sufficient chipping resistance even when its dry film thickness is, for example, less than about 500 microns. But when marked corrosion resistance is desired at the same time, it is preferably at least about 500 microns. The drying of the coated surface may be room temperature drying or by baking. Preferably, it is pre-dried at about 80° C. and then heated in a drying oven at about 120° to about 180° C.

Thus, according to this invention, there is provided a method for imparting anti-chipping property to a substrate, which comprises applying an acrylic resin emulsion coating composition as described above to the surface or surfaces of the substrate in an amount sufficient to form a film having a dry thickness of about 200 to about 1200 microns, and drying the film.

The following examples illustrate the present invention more specifically.

In the following examples, the critical film thickness against cratering, chipping resistance, cold bending resistance, water resistance, hot water resistance, corrosion resistance and flash rusting prevention are tested and evaluated as follows:

(1) Test for the prevention of flash rusting.

(1-1) On a composition which forms a transparent film

A film-forming composition having the composition shown in Table 1 was coated on one surface of a polished steel sheet (JIS-G3144) by a brush so that the resulting film after drying would have a thickness of 100 microns, and dried at 25° C. for 24 hours. After the 24-hour drying, the color of the surface of the steel sheet was visually inspected through the dry coated film, and evaluated on the following standard.

| Grade | Color |
| --- | --- |
| 5 | No change in color. |
| 4 | Colored in slight pale brown. |
| 3 | Colored in medium pale brown. |
| 2 | Colored in slightly dark brown. |
| 1 | Colored in dark brown. |

(1-2) On a composition which forms a non-transparent film

In the same way as in (1-1), a dry coated film was prepared from a film-forming composition having the following formulation.

| | |
| --- | --- |
| Acrylic resin emulsion (having the [A]/[B] ratio shown in Table 1) | 100 parts by weight |
| Calcium carbonate (*1) | 90 |
| Zinc molybdate (*2) | 25 |
| Carbon black (*3) | 1 |
| Sodium tripolyphosphate as a dispersant | 3 |
| Bentonite (*4) as a thickening agent | 0.5 |
| Water | 10 |

(*1): Sunlight #100 (a product of Takehara Chemical Industry Co., Ltd.)
(*2): MOLY-WHITE 101 (a product of Honjo Chemical Co., Ltd.)
(*3): FT class (a product of Asahi Thermal Co., Ltd.)
(*4): Kunipure (a product of Kunimine Industry Co., Ltd.)

The coated steel sheet was boiled in water and then taken out. While it is hot, the coated film was removed from the steel sheet by using a metal spatula. The surface of the steel sheet on which the coated film had been formed was visually observed, and evaluated on the same standard as shown in (I-1) above.

(2) Test for the critical film thickness against cratering

The composition which forms a non-transparent film in accordance with the formulation given in (1), (1-2) was coated on one surface of a polished steel sheet (JIS G-3144) by means of an airless spray in areas having a width of about 10 cm and progressively different dry film thicknesses. After the coating, the coated steel sheet was dried at 100° C. for 30 minutes. The coated surface was visually observed. Those areas which showed no perceptible cratering (blister) were detected, and the maximum dry film thikcness of these coated areas was defined as the critical film thickness against cratering. Larger film thickness values show better property of preventing cratering.

(3) Test for hot water resistance.

The composition for forming a non-transparent film having the formulation described in (1), (1-2) was coated on one surface of a lead-tin alloy plated steel sheet (Tin Sheet, a product of Shinnippon Steel-Making Co., Ltd.) by means of an airless spray so that the thickness of the coated film after drying would become 300 microns. The coated sheet was dried at 100° C. for 30 minutes, and then the coated steel sheet was immersed in tap water at 45° C. for 10 days. Then, the coated steel sheet was taken out, and the state of occurrence of blisters on the coated surface (the size and amount of blisters) is expressed in accordance with the method of ASTM D714-56. The indicated numerals show the size of the blisters based on photographic evaluation by ASTM D714-56. For example, the absence of blisters can be rated as 10; the presence of a blister having a diameter of less than about 1 mm, as 8; the presence of a blister having a diameter of about 1 to 1.5 mm, as 6; the presence of a blister having a diameter of about 1.5 to about 2.5 mm, as 4; and the presence of a blister having a diameter of at least about 2.5 mm, as 2. Larger numerals show better state of blisters. The indicated alphabetical symbols indicated the amount of blisters in four stages based on the photographic evaluation in accordance with ASTM D714-56. It is rated as F, M, MD, and D (when the amount of blisters is large and they exist closely on the entire surface) in increasing order of the amounts of blisters.

(4) Test for chipping resistance

A coated steel (lead-tin alloy plated steel sheet) having a dry film thickness of 300 microns prepared in the same way as in (3) above was fixed at an angle of 60° to a horizontal surface, a vinyl chloride resin pipe having a diameter of 20 mm and including a horizontal opening close to the coated surface was positioned perpendicularly. From a height of 2 m, nuts (JIS B-1181, Type 3, M-4) were continuously let fall onto the coated surface through the inside of the pipe. The total weight of the nuts which fell until the coated surface was damaged and the steel substrate was exposed was determined. The larger this value, the better the chipping resistance.

(5) Cold bending resistance test

A coated steel sheet (lead-tin alloy plated steel sheet) having a dry film thikcness of 300 microns prepared in the same way as in (3) above was maintained at a predetermined low temperature for 1 hour, and then bent with the coated surface outwardly and the non-coated surface inwardly using an iron pipe having a diameter of 1 inch as a bending axis in a direction in which the bent sections of the inside non-coated surface on both sides of the iron pipe met each other. The coated surface at the bent portion was visually observed, and the lowest temperature at which a crack reaching the steel substrate did not occur in the coated film was determined. Usually, a plurality of coated steel sheet samples kept at higher to lower temperatures were used in the test.

(6) Water resistance test

The same test as in (3) was carried out except that the sample was immersed for 10 days in tap water at 25° C. The results were evaluated in accordance with the method of ASTM D714-56.

(7) Corrosion resistance test

One surface of the same lead-tin alloy plated steel sheet as used in (3) was abraded to a depth of about 0.1 mm by using a disc grinder with a #36P disc to remove the plated film, and form an abraded surface having a length of about 120 mm and a width of 20 mm. The abraded surface was washed with a thinner and dried. The same composition as in (3) was coated on the entire surface of the plated steel sheet including the abraded surface, and dried in the same way. The resulting sheet was used as a sample and subjected to a salt spray test in accordance with JIS Z-2371. The results are expressed as the time (hours) which elapsed until rust occurred in the coated portion of the abraded surface.

EXAMPLES 1-5 AND COMPARATIVE EXAMPLES 1-13

Production of the resin emulsion [A]

A 2-liter round-bottomed flask equipped with an agitator was charged with 255 g of water, and the inside of the flask was purged with nitrogen. Then, the inside of the flask was heated to a temperature of 60° C. In each run, 28 g of each of the surface-active agents indicated in Table 1 was dissolved in 257 g of water. With stirring, 865 g of a mixture of each of the polymerizble monomers and each of the alpha,beta-unsaturated carboxylic acids in the proportions given in (A) and (B) in Table 1 was gradually added to form an emulsion of the monomeric mixture. The 2-liter round-bottomed flask was charged with 0.4 g of ammonium persulfate and 0.4 g of sodium metabisulfite with stirring. Then, while continuously adding 1150 g of the emulsion of the mixed monomers over 5 hours, and 39 g of a 5% aqueous ammonium persulfate solution and 39 g of a 5% aqueous sodium metabisulfite solution over 6 hours, the monomers were emulsion-polymerized. Thereafter, the emulsion polymerization was continued further for 1 hour (total 7 hours) at a reaction temperature of 60° C.

Each of the water-soluble polyvalent metal salts indicated in Table 1 was added in the indicated amount to 100 parts by weight (solids content) of the resulting resin emulsion [A], and 14% aqueous ammonia was added. Consequently, an acrylic resin emulsion having a pH of 6.5 and a solids content of about 60% was obtained.

Production of the resin emulsion [B]

A resin emulsion [B] was prepared by performing the same emulsion polymerization as in the production of the resin emulsion [A] except that the type and amount of the surfactant and the monomer composition were changed as shown in Table 1. A milk white resin emulsion [B] having a solids content of about 60% was obtained.

Each of the water-soluble polyvalent metal salts indicated in Table 1 was added in the indicated amount to 100 parts (solids) o the resin emulsion [B], and 14% aqueous ammonia was added. Consequently, an acrylic resin emulsion having a pH of 6.5 and a solids content of about 60% was obtained.

Table 1 summarizes the various properties of the acrylic resin emulsions [A] and [B]. The properties of a coated film prepared from a transparent film-forming composition prepared from a blend of the resin emulsion [A] and [B] are summarized in Table 2.

Furthermore, a non-transparent film-forming composition was prepared from the blend of the resin emulsions in accordance with the formulation given in (1), (1-2), and the various properties of a coated film prepared from it were tested. The results are given in Table 2.

The various abbreviations of the surfactants and polymerizable monomers given in Table 1 are as follows:

Surfactants

POE.POP polymer: polyoxyethylene/polyoxypropylene block copolymer nonionic surfactant (tradenames: Repol B-181, B-188, Toho Chemical Industry Co., Ltd.; Pronone 20-1, 208, Nippon Oils and Fats Co., Ltd.

POE.NPE: polyoxyethylene nonylphenyl ether (tradenames Nonion NS-230, NS-240, Nippon Oils and Fats Co., Ltd.; Noigen EA-170, Daiichi Kogyo Seiyaku Co., Ltd.; Emulgen 950, Kao Soap Co., Ltd.)

POE.OPE: polyoxyethylene octylphenyl ether (tradenames: Nonion HS-230, HS-240, Nippon Oils and Fats, Co., Ltd., Noigen EA-151: Daiichi Kogyo Seiyaku Co., Ltd.; Emulgen 810S, Kao Soap Co., Ltd.

DBSN: sodium dodecylbenzenesulfonate (Newlex R, Nippon Oils and Fats Co., Ltd.; Neogen R, Daiinichi Kogyo Seiyaku Co., Ltd; 1 Neopelex No. 6, Kao Soap Co., Ltd.)

Polymerizable monomers

EA: ethyl acrylate
BA: butyl acrylate
2EHA: 2-ethylhexyl acrylate
MMA: methyl methacrylate
AA: acrylic acid
St: styrene

TABLE 1

| Example (Ex.) or Comparative Example (CEx.) | Ex. 1 | CEx. 1 | CEx. 2 | CEx. 3 | CEx. 4 | CEx. 5 | CEx. 6 | CEx. 7 | CEx. 8 |
|---|---|---|---|---|---|---|---|---|---|
| Water-soluble polyvalent metal salt (per 100 parts by weight of the emulsion resin as solids) | Zinc acetate [A] 3.4 parts [B] 2.2 parts | Zinc acetate 3.4 parts — | Zinc acetate [A] 3.4 parts [B] 2.2 parts | Zinc acetate [A] 3.4 parts [B] 2.2 parts | Zinc acetate 3.4 parts 2.2 parts | Zinc acetate 3.4 parts 2.2 parts | Zinc acetate [A] 3.4 parts [B] 2.2 parts | Zinc acetate 3.4 parts 2.2 parts | Zinc acetate 3.4 parts 2.2 parts |
| Surfactant Type | (1) POE.POP Polymer (2) POE.NPE | (1) POE.POP Polymer — | (1) POE.POP Polymer (2) POE.NPE | (1) POE.POP Polymer (2) POE.NPE | (1) POE.POP Polymer (2) POE.NPE | (1) POE.POP Polymer (2) POE.NPE | (1) Sodium dodecyl-benzene-sulfonate (2) POE.NPE | (1) POE.POP Polymer (2) POE.NPE | (1) POE.POP Polymer (2) POE.NPE |
| Amount (weight ratio of (1)/(2)) | 86/14 | | 86/14 | 86/14 | 86/14 | 86/14 | 32/68 | 86/14 | 86/14 |
| Resin composition | | | | | | | | | |
| Glass transition temp. | | | | | | | | | |
| Tg(A) (°C.) | −45 | −45 | −45 | −45 | −47.5 | −40 | −45 | −5 | −59 |
| Tg(B) (°C.) | −26 | — | −26 | −26 | −29 | −21 | −26 | −2 | −2 |
| Tg(B)−Tg(A) (°C.) | 19 | — | 19 | 19 | 18.5 | 19 | 19 | 3 | 57 |
| Monomer composition (% by weight) [A] | EA/BA/AA 33.2/64.2/2.6 | EA/BA/AA 33.2/64.2/2.6 | EB/BA/AA 33.2/64.2/2.6 | EA/BA/AA 33.2/64.2/2.6 | EA/BA 34.5/65.5 | EA/BA/AA 31/62/7 | EA/BA/AA 33.2/64.2/2.6 | EA/MMA/AA 77/20/3 | 2EHA/AA 97/3 |
| [B] | EA/BA/AA 92.8/4.6/2.6 | — | EA/BA/AA 92.8/4.6/2.6 | EA/BA/AA 92.8/4.6/2.6 | EA/BA 94/6 | EA/BA/AA 90/3/7 | EA/BA/AA 92.8/4.6/2.6 | BA/MMA/AA 53/45/2 | EA/MMA/AA 53/45/2 |
| Particle diameter of the acrylic resin emulsion (μ) [A] | 0.36 | 0.36 | 0.36 | 0.36 | 0.36 | 0.36 | 0.14 | 0.32 | 0.33 |
| [B] | 0.40 | — | 0.40 | 0.40 | 0.40 | 0.40 | 0.16 | 0.39 | 0.40 |
| [A]/[B] | 100/100 | | 100/10 | 100/350 | 100/100 | 100/100 | 100/100 | 100/100 | 100/100 |

| Example (Ex.) or Comparative Example (CEx.) | CEx. 9 | CEx. 10 | CEx. 11 | CEx. 12 | CEx. 13 | Ex. 2 | Ex. 3 | Ex. 4 | Ex. 5 |
|---|---|---|---|---|---|---|---|---|---|
| Water-soluble polyvalent metal salt (per 100 parts by weight of the emulsion resin as solids) | Zinc acetate [A] 3.4 parts [B] 2.2 parts | Zinc acetate 3.4 parts 2.2 parts | Magnesium carbonate 3.4 parts 2.2 parts | Zinc acetate [A] 0.05 part [B] 0.05 part | Zinc acetate 13 parts 13 parts | Zinc acetate 3.4 parts 2.2 parts | Zinc acetate [A] 3.4 parts [B] 2.2 parts | Calcium acetate 2.9 parts 1.9 parts | Calcium acetate 2.9 parts 1.9 parts |
| Surfactant Type | (1) POE.POP Polymer (2) POE.NPE | (1) POE.POP Polymer (2) POE.NPE | (1) POE.POP Polymer (2) POE.NPE | (1) POE.POP Polymer (2) POE.NPE | (1) POE.POP Polymer (2) POE.NPE | (1) POE.POP Polymer (2) POE.NPE | (1) POE.POP Polymer (2) POE.NPE | (1) POE.POP Polymer (2) POE.NPE | (1) POE.POP Polymer (2) POE.NPE |
| Amount (weight ratio of (1)/(2)) | 86/14 | 86/14 | 86/14 | 86/14 | 86/14 | 86/14 | 86/14 | 86/14 | 86/14 |
| Resin composition | | | | | | | | | |
| Glass transition temp. | | | | | | | | | |
| Tg(A) (°C.) | −45 | −38 | −45 | −45 | −45 | −45 | −45 | −40 | −35 |
| Tg(B) (°C.) | +5 | −38 | −26 | −26 | −26 | −26 | −26 | −18 | −9 |
| Tg(B)−Tg(A) (°C.) | 50 | 0 | 19 | 19 | 19 | 19 | 19 | 22 | 26 |
| [A]/[B] | 100/100 | 100/100 | 100/100 | 100/100 | 100/100 | 100/120 | 100/200 | 100/90 | 100/30 |

TABLE 1-continued

| | | | | | | | | | | |
|---|---|---|---|---|---|---|---|---|---|---|
| Monomer composition (% by weight) | [A] | EA/BA/AA 33.2/64.2/2.6 | EA/BA/AA 59/38.4/2.6 | EA/BA/AA 33.2/64.2/2.6 | EA/BA/AA 33.2/64.2/2.6 | EA/BA/AA 33.2/64.2/2.6 | EA/BA/AA 33.2/64.2/2.6 | EA/BA/AA 33.2/64.2/2.6 | EA/BA/AA 49.4/48.0/2.6 | EA/BA/AA 65.5/31.9/2.6 |
| | [B] | EA/MMA/AA 49.0/48.4/2.6 | BA/MMA/AA 81/16.4/2.6 | EA/BA/AA 92.8/4.6/2.6 | EA/BA/AA 92.8/4.6/2.6 | EA/BA/AA 92.8/4.6/2.6 | EA/BA/AA 92.8/4.6/2.6 | EA/BA/AA 92.8/4.6/2.6 | 2EHA/MMA/AA 62.4/33.0/2.6 | 2EHA/MMA/AA 56.0/41.4/2.6 |
| Particle diameter of the acrylic resin emulsion (μ) | [A] | 0.36 | 0.34 | 0.36 | 0.36 | 0.36 | 0.36 | 0.36 | 0.45 | 0.32 |
| | [B] | 0.40 | 0.41 | 0.40 | 0.40 | 0.40 | 0.40 | 0.40 | 0.53 | 0.34 |

TABLE 2

| Properties | Ex. 1 | CEx. 1 | CEx. 2 | CEx. 3 | CEx. 4 | CEx. 5 | CEx. 6 | CEx. 7 | CEx. 8 | CEx. 9 | CEx. 10 | CEx. 11 |
|---|---|---|---|---|---|---|---|---|---|---|---|---|
| Transparent film | | | | | | | | | | | | |
| Flash rusting | 5 | 5 | 4 | 3 | 4 | 2 | 3 | 4 | 4 | 4 | 4 | 1 |
| Non-transparent film | | | | | | | | | | | | |
| Flash rusting | 5 | 5 | 4 | 3 | 3 | 2 | 4 | 4 | 4 | 4 | 4 | 2 |
| Critical film thickness against cratering ($\mu$) | 1600 | 1200 | 900 | 900 | 900 | 500 | 400 | 1000 | 300 | 1200 | 800 | 900 |
| Hot water resistance | 10 | 8F | 6F | 6M | 4F | 6MD | 6M | 8F | 6M | 8F | 6M | 4M |
| Chipping resistance (kg) | 37 | 33 | 25 | 20 | 15 | 20 | 30 | 15 | 20 | 20 | 20 | 25 |
| Cold bending resistance (°C.) | less than −30 | −25 | −20 | −15 | −25 | −15 | −20 | −10 | −25 | −20 | −15 | −20 |
| Water resistance | 10 | 8F | 6F | 6F | 6F | 6M | 6F | 8F | 6M | 6F | 6MD | 6F |
| Corrosion resistance (hours) | 1500 No change | 1500 No change | 1200 rusted | 1200 rusted | 1000 rusted | 300 rusted | 400 rusted | 1500 No change | 1000 rusted | 1500 No change | 1200 rusted | 1200 rusted |

| Properties | CEx. 12 | CEx. 13 | Ex. 2 | Ex. 3 | Ex. 4 | Ex. 5 |
|---|---|---|---|---|---|---|
| Transparent film | | | | | | |
| Flash rusting | 1 | 4 | 5 | 5 | 5 | 5 |
| Non-transparent film | | | | | | |
| Flash rusting | 1 | 4 | 5 | 5 | 5 | 5 |
| Critical film thickness against cratering ($\mu$) | 900 | 800 | 1600 | 1650 | 1800 | 1300 |
| Hot water resistance | 4MD | 6F | 10 | 8F | 8F | 10 |
| Chipping resistance (kg) | 20 | 25 | 39 | 39 | 37 | 37 |
| Cold bending resistance (°C.) | −15 | −10 | less than −30 | less than −30 | less than −30 | less than −30 |
| Water resistance | 6M | 6F | 10 | 8F | 8F | 10 |
| Corrosion resistance (hours) | 700 rusted | 1200 rusted | 1500 No change | 1500 No change | 1500 No change | 1500 No change |

What is claimed is

1. An acrylic or methacrylic resin emulsion coating composition comprising a blended mixture composed of
   (1) 100 parts by weight as solid resin content of a copolymer resin emulsion [A], the copolymer resin therein having a glass transition temperature Tg(A), determined by the DSC method, of −10° to about −55° C., and said copolymer resin emulsion [A] being an aqueous emulsion-copolymerization product being free from a copolymerizable diallyl component and prepared by emulsion copolymerization of from 95 to 99.5% by weight of at least one monomeric ester (a) of at least one of acrylic and methacrylic acid and 0.5 to 5% by weight of at least one alpha,beta-unsaturated carboxylic acid (b) in the presence of, as a nonionic surface-active agent, a polyoxyethylene/polyoxypropylene block copolymer,
   (2) 20 to 300 parts by weight as solid resin content of a copolymer resin emulsion [B], the copolymer resin therein having a glass transition temperature Tg(B), determined by the DSC method, of less than 0° C., and satisfying the following equation $$10° C. \leq Tg(B) - Tg(A) \leq 55° C.$$

and said copolymer resin emulsion [B] being an aqueous emulsion-copolymerization product being free from a copolymerizable diallyl component and prepared by emulsion copolymerization of from 95 to 99.5% by weight of at least one monomeric ester (a)' of at least one of acrylic and methacrylic acid and 0.5 to 5% by weight of at least one alpha,beta-unsaturated carboxylic acid (b)' in the presence of, as a nonionic surface-active agent, a polyoxyethylene/polyoxypropylene block copolymer, and
   (3) about 0.2 to about 10 parts by weight per 100 parts of resins, as solids, of emulsions [A] and [B] combined, of a water-soluble polyvalent metal salt [C] of an inorganic or organic acid, the metal salt [C] having a solubility of at least 5 when it is expressed as the grams of said metal salt dissolved in 100 g of water at 20° C.

2. The composition of claim 1 wherein the copolymer resins in the copolymer resin emulsions [A] and [B] have an average particle diameter in the range of from 0.25 to 0.60 micron.

3. The composition of claim 1 wherein the ester (a) or (a)' is at least one member selected from the group consisting of $C_1-C_{10}$ alkyl esters of acrylic acid, $C_1-C_{10}$ alkyl esters of methacrylic acid, glycidyl esters of acrylic acid, glycidlyl esters of methacrylic acid, hydroxy-$(C_1-C_4)$alkyl esters of acrylic acid and hydroxy-$(C_1-C_4)$alkyl esters of methacrylic acid.

4. The composition of claim 1 wherein the alpha, beta-unsaturated carboxylic acid (b) or (b)' is at least one member selected from the group consisting of alpha, beta-unsaturated carboxylic acids having 3, 4 or 5 carbon atoms and anhydrides thereof.

5. The coating composition of claim 1 wherein the water-soluble polyvalent metal salt [C] is at least one metal salt selected from the group consisting of lower aliphatic carboxylic acid salts, hydrochlorides, sulfates and nitrites of divalent or trivalent metals.

6. The coating composition of claim 1 wherein the total solids resin content of the copolymer resin emulsions [A] and [B] is about 30 to about 70% by weight based on the total weight of the emulsions [A] and [B].

7. The coating composition of claim 1 which further comprises at least one additive selected from the group consisting of other water-dispersible resins, fillers, coloring agents, antiseptics, dispersing agents, thickening agents, thixotropic agents, antifreezing agents and pH adjusting agents.

8. The composition of claim 1 wherein the esters (a) and (a)' are independently selected from the group consisting of methylacrylate, ethylacrylate, butylacrylate, 2-ethylhexylacrylate, methylmethacrylate, butylmethacrylate, 2-ethylhexylmethacrylate and mixtures thereof; and wherein the alpha,beta-unsaturated carboxylic acids (b) and (b)' are each independently selected from the group consisting of acrylic acid, methacrylic acid, itaconic acid and mixtures thereof.

* * * * *